(12) United States Patent  
Maguire et al.

(10) Patent No.: US 9,281,547 B2  
(45) Date of Patent: Mar. 8, 2016

(54) TRACTION BATTERY THERMAL MANAGEMENT SYSTEM

(71) Applicant: Ford Global Technologies, LLC, Dearborn, MI (US)

(72) Inventors: Patrick Daniel Maguire, Ann Arbor, MI (US); Bhaskara Boddakayala, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 216 days.

(21) Appl. No.: 13/826,754

(22) Filed: Mar. 14, 2013

(65) Prior Publication Data

US 2014/0272515 A1  Sep. 18, 2014

(51) Int. Cl.
*H01M 2/12* (2006.01)
*H01M 10/6568* (2014.01)
*H01M 2/10* (2006.01)
*B60L 11/18* (2006.01)
*H01M 10/625* (2014.01)
*H01M 10/613* (2014.01)

(52) U.S. Cl.
CPC ....... *H01M 10/5077* (2013.01); *B60L 11/1874* (2013.01); *B60L 11/1879* (2013.01); *H01M 2/1077* (2013.01); *H01M 10/613* (2015.04); *H01M 10/625* (2015.04); *H01M 10/6568* (2015.04); *H01M 2220/20* (2013.01); *Y02T 10/7005* (2013.01); *Y02T 10/705* (2013.01)

(58) Field of Classification Search
CPC ................ H01M 10/5077; H01M 10/6568; H01M 2/12
USPC .............. 429/71, 72, 88, 120, 121, 154
See application file for complete search history.

(56) References Cited

U.S. PATENT DOCUMENTS

| | | | |
|---|---|---|---|
| 5,628,361 A * | 5/1997 | Getto | 165/67 |
| 6,293,011 B1 | 9/2001 | Hasegawa et al. | |
| 6,793,121 B2 | 9/2004 | Nitta et al. | |
| 7,855,888 B2 | 12/2010 | Peterson | |
| 2008/0299446 A1 * | 12/2008 | Kelly | H01M 2/1077 429/88 |
| 2009/0255528 A1 | 10/2009 | Weise et al. | |
| 2012/0043754 A1 * | 2/2012 | Gadawski | 285/189 |

* cited by examiner

*Primary Examiner* — Karie O'Neill Apicella
(74) *Attorney, Agent, or Firm* — David B. Kelley; Brooks Kushman P.C.

(57) ABSTRACT

A modular thermal management system for a battery in an electric vehicle is provided. The thermal management system includes a battery module having a plurality of module ports for conducting heat exchange fluid to regulate temperature in a traction battery. The thermal management system also includes a manifold having a plurality of connector ports corresponding to the plurality of module. A retention feature is located on the manifold or the battery module for securing the manifold to the battery module to ensure the connector ports remain fluidly sealed to the module ports.

12 Claims, 3 Drawing Sheets

TRACTION BATTERY THERMAL MANAGEMENT SYSTEM

TECHNICAL FIELD

A modular fluid transport system is disclosed for various embodiments of a modular thermal management system for a battery in an electric vehicle.

BACKGROUND

Vehicles such as battery-electric vehicles (BEVs), plug-in electric vehicles (PHEVs) or hybrid-electric vehicles (HEVs) contain a battery, such as a high voltage battery, to act as an energy source for the vehicle. Battery capacity and cycle life can change depending on the operating temperature of the battery. It is generally desirable to maintain the battery within a specified temperature range while the vehicle is operating or while the vehicle is charging.

The vehicles with batteries may include a cooling system to provide temperature control of the battery, thereby maintaining the charging capacity and extending the battery life, and improving other battery performance characteristics.

SUMMARY

According to one or more embodiments of the present disclosure, a traction battery thermal management system is provided. The thermal management system includes a battery module having a plurality of battery cells and a heat exchanger for regulating temperature of the plurality of battery cells. The battery module is contained in a battery housing. A plurality of heat exchanger ports are in fluid communication with the heat exchanger for conducting a heat exchange fluid to the heat exchanger. The thermal management system includes a manifold having a plurality of connector ports corresponding to the plurality of heat exchanger ports for distributing the fluid to the heat exchanger ports. A retention clip is connected to one of the battery housing or the manifold and a receiving portion formed in the other of the battery housing or the manifold mates with the retention clip. When the connector ports are fully secured to the heat exchanger ports, the retention clip mates with the receiving portion and prevents movement of the manifold to ensure the connector ports remain fluidly sealed to the heat exchanger ports.

In another embodiment, the clip is integrally formed in the battery housing.

In a further embodiment, the clip includes at least one tab extending from the battery housing to cooperate with the receiving portion.

In yet another embodiment, the receiving portion includes a flange integrally formed and extending from a manifold body. The clip engages the flange with a snap-fit to retain the manifold to the battery housing.

In another embodiment, the clip includes a locating pin and the flange includes a locating aperture to cooperate with the locating pin to align the manifold to the battery module.

In a further embodiment, the thermal management system also includes a plurality of flexible connecting portions. One of the flexible connecting portions extends between one of the plurality of manifold connector ports and one of the plurality of heat exchanger ports to form a connection angle therebetween.

According to one other embodiment of the present disclosure, a traction battery thermal management system is provided. The thermal management system includes a plurality of heat exchanger ports for conducting heat exchange fluid to a heat exchanger for regulating temperature of a plurality of battery cells. The thermal management system also includes a manifold having a plurality of connector ports for distributing the fluid to each of the corresponding heat exchanger ports. An overmold portion is formed along each of the plurality of heat exchanger ports. A weld joint bonds and seals the overmold portion to the connector ports of the manifold. The weld joint ensures the connector ports remain fluidly sealed to the heat exchanger ports.

In another embodiment, the weld joint includes an annular weld.

In a further embodiment, each overmold portion includes an alignment feature to mate with a corresponding alignment feature adjacent each of the connector ports to ensure each of the heat exchanger ports is aligned with each of the connector ports prior to sealing with the weld joint.

In yet another embodiment, at least one of the alignment features includes a channel formed in one of the manifold or the overmold portion. The other alignment feature includes a rib to mate with the channel to ensure each of the heat exchanger ports is aligned with each of the connector ports prior to sealing with the weld joint.

In a further embodiment, a distal end of the overmold portion includes a curved surface to accommodate positional variation of each of the heat exchanger ports. The curved surface ensures each of the heat exchanger ports is aligned with each of the connector ports prior to sealing with the weld joint.

According to one further embodiments of the present disclosure, a traction battery thermal management system is provided. The thermal management system includes a battery module having a plurality of module ports for conducting heat exchange fluid to regulate temperature in a traction battery. The thermal management system also includes a manifold having a plurality of connector ports corresponding to the plurality of module. A retention feature is located on the manifold or the battery module for securing the manifold to the battery module to ensure the connector ports remain fluidly sealed to the module ports.

In another embodiment, the thermal management system also includes a battery housing containing the battery module. The retention feature is integrally formed in either the battery housing or the manifold. The system includes at least two retention features for securing the manifold to the housing.

In a further embodiment, the retention feature includes a retention clip connected to either the battery housing or the manifold. The retention feature also includes a receiving portion formed in the other of the battery housing or the manifold to mate with the retention clip. When the connector ports are fully secured to the heat exchanger ports, the retention clip mates with the receiving portion and prevents movement of the manifold to ensure the connector ports remain fluidly sealed to the heat exchanger ports.

In yet another embodiment, the receiving portion includes a flange integrally formed and extending from a manifold body, wherein the clip engages the flange with a snap-fit to retain the manifold to the battery housing.

In a further embodiment, the clip includes a locating pin and the flange includes a locating aperture to cooperate with the locating pin to align the manifold to the battery module.

In another embodiment, the thermal management system also includes a plurality of flexible connecting portions. The flexible connecting portions extend between the manifold connector ports and the heat exchanger ports to form a connection angle therebetween.

In a further embodiment, the retention feature includes an overmold portion formed along each of the plurality of heat exchanger ports. The retention feature also includes a weld joint for bonding and sealing the overmold portion to the connector ports of the manifold. The retention feature ensures the connector ports remain fluidly sealed to the heat exchanger ports.

In yet another embodiment, the weld joint includes an annular weld.

In a further embodiment, each overmold portion includes an alignment feature to mate with a corresponding alignment feature adjacent each of the connector ports to ensure each of the heat exchanger ports is aligned with each of the connector ports prior to sealing with the weld joint.

The above embodiments and other aspects of the disclosure will be better understood in view of the attached drawings and following detailed description of the illustrated embodiments.

DETAILED DESCRIPTION

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
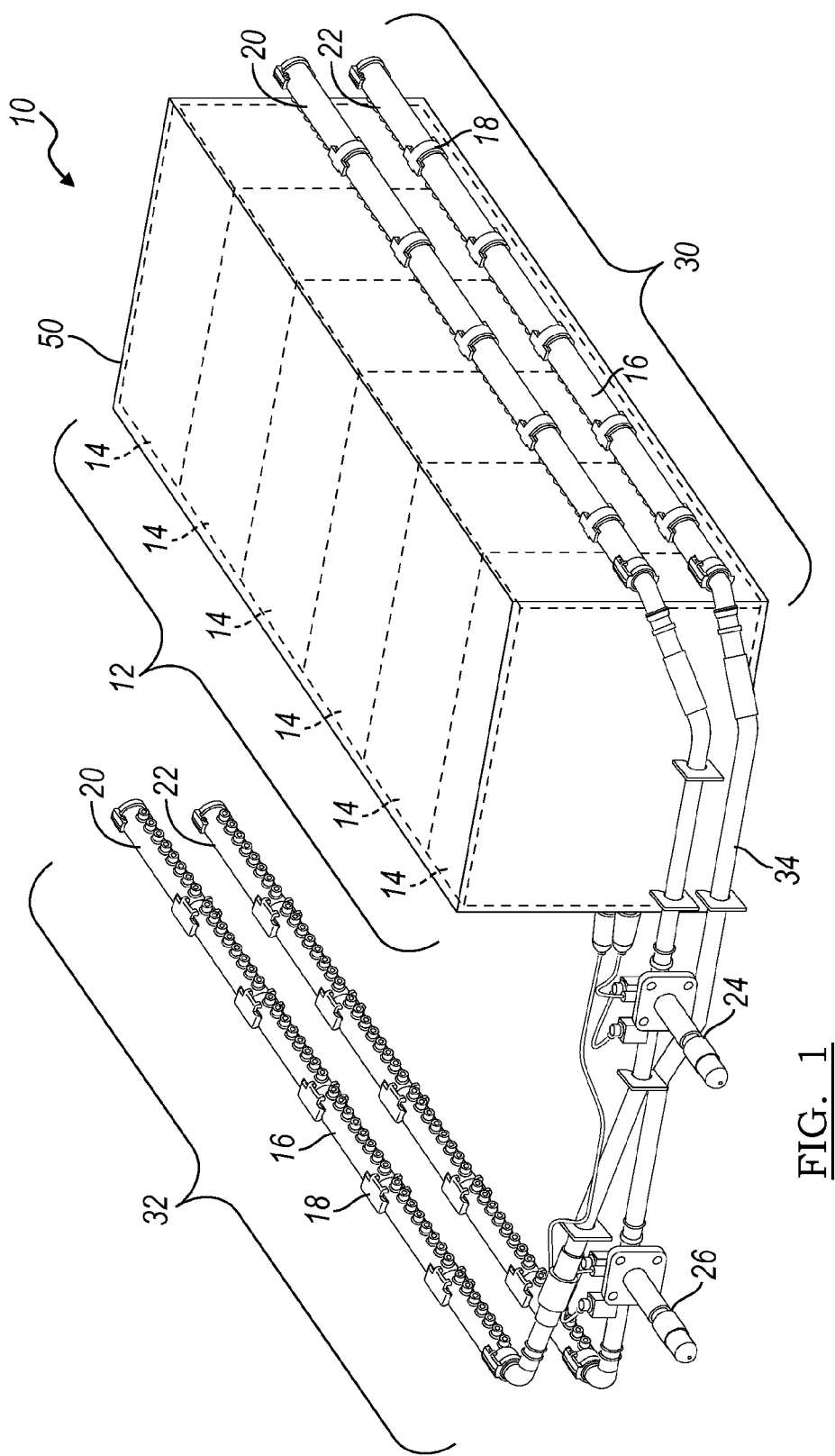
FIG. 1 is a perspective view of a thermal management system according to an embodiment of the present disclosure.

FIG. 1 illustrates a fluid thermal management system 10 for a traction battery 12. The battery 12 may be a battery for a battery-electric vehicle (BEV), a plug-in electric vehicle (PHEV) or a hybrid-electric vehicle (HEV), or any other application requiring thermal management of a modular component, such as a battery.

As illustrated in FIG. 1, the battery 12 is a battery pack having an array of battery modules 14. Each battery module 14 may contain one battery cell or a plurality of battery cells. The battery 12 may be a modular battery adapted to accommodate a multiple of configurations of battery modules 14 connected together to make the different size or capacity batteries 12. Different battery configurations may be required because of packaging constraints in the vehicle, different power requirements in different applications or any combination of variables affecting the size of the battery 12.

The individual battery cells within each battery module 14 are heated and cooled with liquid coolant from the thermal management system 10. The temperature of the battery 12 and of each cell determines the amount of charge that the battery 12 can accept and the amount of charge that can be used when stored in the battery 12. The thermal management system 10 regulates the cell temperatures in order to maintain the battery's useful life, permit a proper charge, and meet vehicle performance attributes. The thermal management system 10 provides heating or cooling via fluid heat transfer for the battery 12. In one embodiment, the thermal management system 10 circulates liquid coolant through cooling channels in heat exchanger fins located adjacent to the cells in the battery 12 to heat or cool the battery 12 using primarily convective heat transfer.

The thermal management system 10 includes a plurality of modular manifold segments 16 which are adapted to connect to each of the cooling channels or heat exchanger fins. The manifold segments 16 may be connected together to accommodate different configurations of batteries 12 and thermal management systems 10. The manifold segments 16 may be sized to accommodate different types of battery modules 14.

The manifold segments 16 may be connected together with manifold clips 18. The manifold segments 16 may be coupled together to form an upper thermal line 20 and a lower thermal line 22. The upper thermal line 20 may be connected to a fluid inlet 24. The lower thermal line 22 may be connected to a fluid outlet 26, or vice versa. The manifold segments 16 may be attached to the battery modules 14. Then, the manifold segments 16 may be connected to each other when the battery modules 14 are connected.

The thermal management system 10 may accommodate multiple banks of battery packs 12. For example, as illustrated in FIG. 1, the thermal management system 10 may have a first bank 30 and a second bank 32. The first bank 30 and the second bank 32 may be connected with a crossover line 34. As shown in FIG. 1, the fluid inlet 24 and fluid outlet 26 are located along the crossover line 34.

Figure 2:
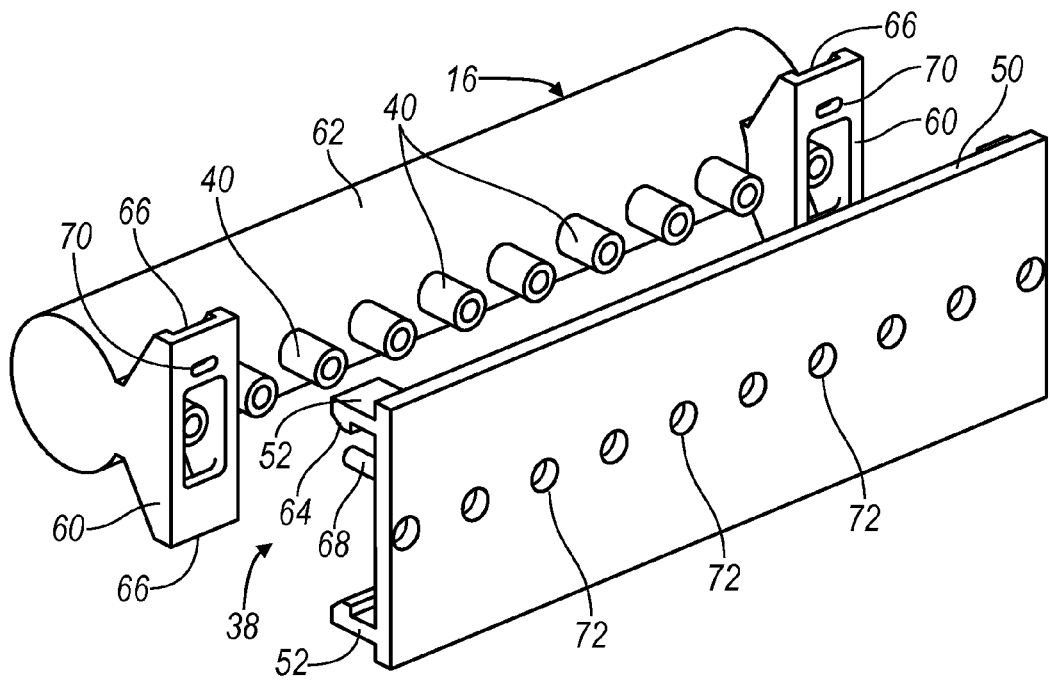
FIG. 2 is an exploded perspective view of a portion of the thermal management system illustrated in FIG. 1 illustrating one embodiment of the present disclosure.

The manifold segments 16 are coupled to the battery modules 14 with an attachment feature 38 in order to prevent the manifold segment 16 from moving. FIG. 2 shows an exploded view of one battery module 14 and one manifold segment 16, illustrating one embodiment of the disclosure in more detail. Each manifold segment 16 includes a plurality of fluid connector ports 40. The fluid connector ports 40 are evenly spaced apart and adapted to connect to cooling channels or heat exchangers that regulate the temperature of the battery cells. In one embodiment, there is a heat exchanger disposed between each of the battery cells in each battery module 14. Each manifold segment 16 includes the fluid connector ports 40 that correspond to a plurality of heat exchanger ports to 44 provide fluid to each heat exchanger between each battery cell.

In the embodiment illustrated in FIG. 2, the manifold segment 16 is clipped to a battery housing 50. A clip 52 may be attached to either the manifold segment 16 or the housing 50. As illustrated in FIG. 2, the clip 52 is integrally formed in the battery housing 50. Heat exchanger ports 44 extend through openings in the battery housing 50

The clip 52 engages a flange 60. The flange may be attached to either the manifold segment 16 or the housing 50. As illustrated in FIG. 2, the flange 60 is integrally formed in the manifold segment 16.

When the clip 52 engages the flange 60, retention tabs 64 engage a retention feature 66 on the flange with an interference fit such as a snap-fit. When the clip 52 engages the flange 60, the positive engagement ensures the manifold segments 16 are fully engaged with the battery housing 50 and then prevents the manifold segment 16 from moving with respect to the battery housing 50.

The clip 52 includes a locating feature 68, such as a locating pin. Similarly, the flange 60 includes a locating aperture 70 to cooperate with the locating feature 68 to align the manifold segment 16 to the battery module housing 50.

The manifold segments 16 may be formed of plastic, or any other suitable material. The fluid connector ports 40 may be formed of a rubber, an elastomer or any gasket material for sealing against the heat exchanger ports 44. The fluid connector ports 40 can be overmolded or insert molded in the molded manifold segments 16. As illustrated, the flange 60 is integrally molded in the manifold segment 16. The flange 60 extends generally perpendicular to a longitudinal manifold body 62

Figure 3:
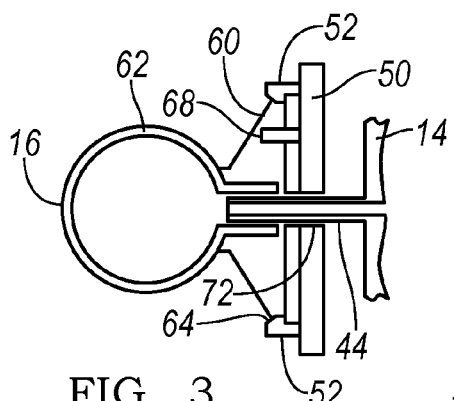
FIG. 3 is a cross-section view of the portion of the thermal management system illustrated in FIG. 2.
Figure 4:
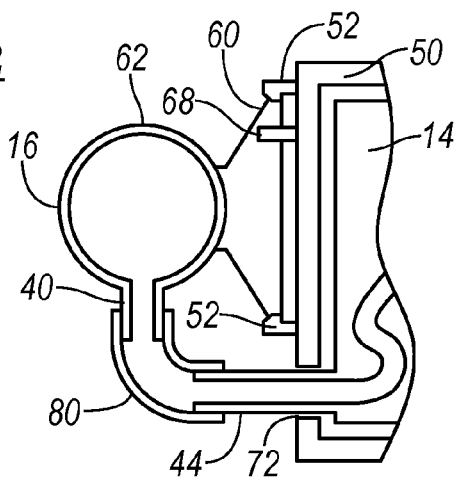
FIG. 4 is a cross-section view of a portion of the thermal management system according to another embodiment of the present disclosure.
Figure 5:
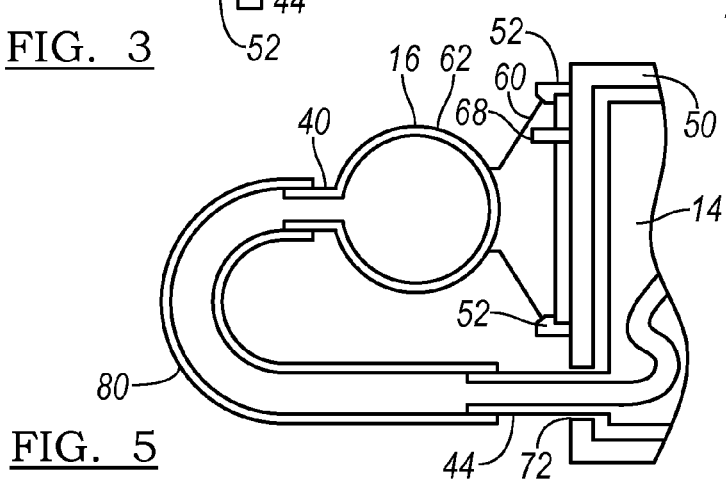
FIG. 5 is a cross-section view of a portion of the thermal management system according to another embodiment of the present disclosure.

FIG. 3 illustrates a cross-section view of the assembled housing 50 and manifold segment 16 of FIG. 2. As shown in FIG. 4 and FIG. 5, the fluid connector ports 40 may also include elongated flexible portion 80. The flexible connection portion 80 may be formed of a rubber, an elastomer or any gasket material for sealing against the heat exchanger ports 44 and the fluid connector ports 40. The flexible connection portion 80 may allow the easy of assembly between the fluid connector ports 40 and the heat exchanger ports 44. The flexible connection portion 80 may also allow design variations where the connector ports 40 are oriented at an angle from the heat exchanger ports 44.

For example, in FIG. 3, the connector ports 40 are aligned coaxially with the heat exchanger ports. However, in FIG. 4, the connector ports 40 are oriented generally perpendicular to the heat exchanger ports 44. The flexible connection portion 80 is angled and extends to connect the connector ports 40 with the heat exchanger ports 44. In FIG. 5, the connector ports 40 are offset vertically, and generally parallel to the heat exchanger ports 44. The flexible connection portion 80 is extends and forms a semi-circular arc to connect the connector ports 40 with the heat exchanger ports 44.

Figure 6:
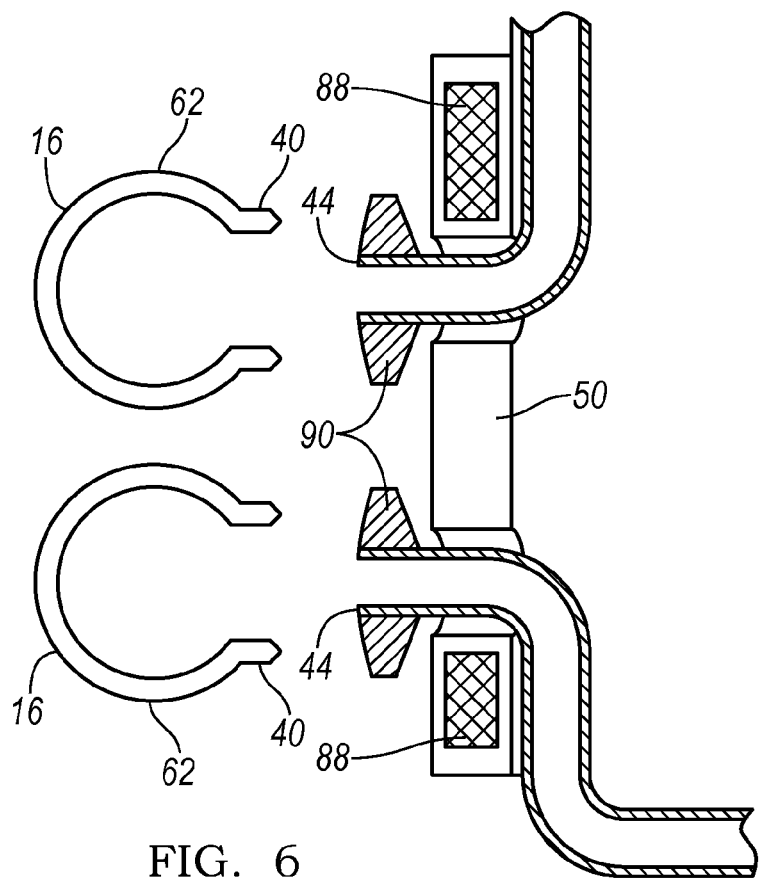
FIG. 6 is a cross-section view of a portion of the thermal management system according to another embodiment of the present disclosure.
Figure 7:
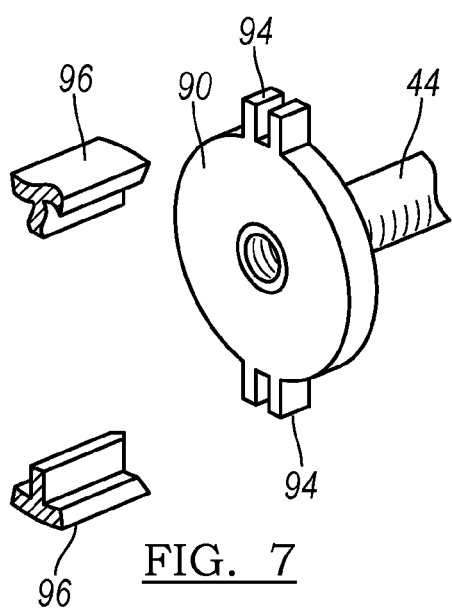
FIG. 7 is an exploded perspective view of a portion of the thermal management system illustrated in FIG. 6.
Figure 8:
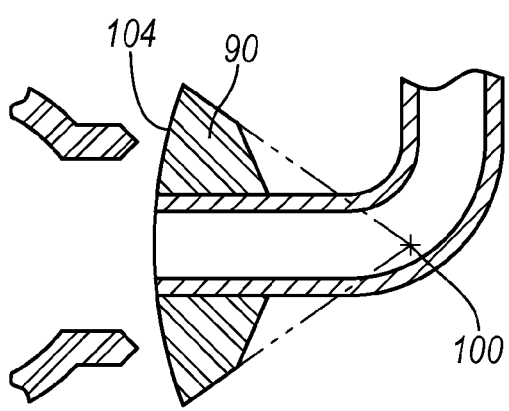
FIG. 8 is a cross-section view of a portion of the thermal management system according to another embodiment of the present disclosure.

In another embodiment illustrated in FIGS. 6-8, the heat exchanger ports 44 may be welded to the connector ports 40 of the manifold segments 16 to ensure the connector ports 40 remain fluidly sealed to the heat exchanger ports 44. FIG. 6 is an exploded, cross-section view of a portion of the thermal management system 10. FIG. 6 shows two manifolds segments 16 which form a portion of the upper thermal line 20 and the lower thermal line 22, respectively. The upper thermal line 20 and the lower thermal line 22 may be connected to a fluid inlet 24 and fluid outlet 26 respectively. Likewise, the two heat exchanger ports 44 may be inlet and outlet ports, respectively.

As shown in FIG. 6, an overmold portion 90 is formed along each of the heat exchanger ports 44. The overmold portion 90 is formed of plastic or a suitable material that is over-molded along the distal end of the heat exchanger port 44. The overmold portion 90 can then be welded to the connector ports 40. A weld joint bonds and seals the overmold portion 90 to the connector ports 40 of the manifold segment 16. The weld joint ensures the connector ports 40 remain fluidly sealed to the heat exchanger ports 44.

The overmold portion 90 mat be welded using ultrasonic welding, or any suitable welding technique. Grips 88 hold and maintain the heat exchanger ports 44 stationary during the welding process. The weld joint may be an annular weld that corresponds to a generally circular opening in connector port 40. However, and suitable weld joint may be used to ensure the connector port 40 is sealed to the overmold portion 90 of the heat exchanger port 44.

To ensure the heat exchanger port 44 and connector port 40 are aligned prior to welding, the overmold portion 90 includes an alignment feature 94. As illustrated, the alignment feature 94 is formed as a channel to mate with a corresponding alignment rib 96 formed in the manifold segment 16. The alignment rib 96 may be formed adjacent each of the connector ports 40 to ensure each of the heat exchanger ports 44 is aligned with each of the connector ports 40 prior to bonding and sealing with the weld joint.

The distal end of the overmold portion 90 includes a curved surface 104 to accommodate positional variation of each of the heat exchanger ports. The distal curved surface 104 is defined based a radius of a fulcrum point 100 along the heat exchanger port 44. The distal curved surface 104 ensures each of the heat exchanger ports 44 are aligned with each of the connector ports 40 prior to welding even if there is positional variation of the heat exchanger port 44 about the fulcrum point 100.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A thermal management system comprising:
a battery having a plurality of ports for conducting fluid to regulate temperature;
a manifold having a plurality of connector ports corresponding to the plurality of battery ports;
a receiving portion formed on the manifold; and
a clip formed on the battery and engaging the receiving portion with an interference fit to retain the manifold to the battery so the connector ports remain fluidly sealed to the battery ports.

2. The system of claim 1 further comprising a battery housing containing the battery, wherein the clip is integrally molded with the battery housing.

3. The system of claim 2 wherein the receiving portion includes a flange integrally molded with and extending from a manifold body, wherein the clip engages the flange with a snap-fit to retain the manifold to the battery housing.

4. The system of claim 3 wherein the clip includes a locating pin and the flange includes a locating aperture to cooperate with the locating pin to align the manifold to the battery.

5. The system of claim 1 further comprising a plurality of flexible connecting portions, wherein one of the plurality of flexible connecting portions extends between one of the plurality of manifold ports and one of the plurality of battery ports to form a connection angle therebetween.

6. The system of claim 1, further comprising at least two receiving portions formed on the manifold, and at least two clips formed on the battery for securing the manifold to the battery.

7. A thermal management system comprising:
a battery module with a plurality of ports for receiving thermal fluid to regulate battery temperature;
a manifold to provide the fluid to the battery module and having a plurality of corresponding ports, each battery port fluidly sealed to the corresponding manifold port; and a clip provided on one of the battery module or the manifold; and a receiving portion formed in the other of the battery module or the manifold to mate with the clip, wherein the battery ports remain fluidly sealed to the manifold ports when the clip is mated to the receiving portion, wherein the receiving portion includes an integrally molded flange, wherein the clip engages the flange with a snap-fit to retain the manifold to the battery housing.

8. The system of claim 7 wherein the clip is integrally molded with the battery module.

9. The system of claim 7 wherein the clip includes at least one tab extending from the battery module to cooperate with the receiving portion.

10. The system of claim 7 wherein the clip includes a locating pin and the flange includes a locating aperture to cooperate with the locating pin to align the manifold to the battery module.

11. The system of claim 7 further comprising a plurality of flexible connecting portions, wherein one of the plurality of flexible connecting portions extends between one of the plurality of manifold ports and one of the plurality of battery ports to form a connection angle therebetween.

12. The system of claim 7, further comprising at least two receiving portions formed on the manifold, and at least two clips formed on the battery for securing the manifold to the battery.

\* \* \* \* \*